United States Patent [19]
Antonelli et al.

[11] Patent Number: 5,530,070
[45] Date of Patent: Jun. 25, 1996

[54] STABLE AQUEOUS METALLIC FLAKE DISPERSION USING PHOSPHATED ACRYLIC POLYMER DISPERSANT

[75] Inventors: Joseph A. Antonelli, Riverton, N.J.; Lee A. E. Becton, Media; Brian P. Devlin, Broomall, both of Pa.; Christopher Scopazzi, Wilmington, Del.

[73] Assignee: E. I. Du Pont de Nemours and Company, Wilmington, Del.

[21] Appl. No.: 519,837

[22] Filed: Aug. 25, 1995

Related U.S. Application Data

[62] Division of Ser. No. 294,002, Aug. 22, 1994.

[51] Int. Cl.$^6$ .......................... C08F 8/40; C08F 265/04; C08F 265/06; C08F 283/10
[52] U.S. Cl. ............ 525/330.4; 525/242; 525/245; 525/255; 525/267; 525/269; 525/284; 525/302; 525/303; 525/308; 525/309; 525/311
[58] Field of Search ................... 525/330.4, 242, 525/245, 255, 267, 269, 284, 302, 303, 308, 309, 311

[56] References Cited

U.S. PATENT DOCUMENTS

| | | | |
|---|---|---|---|
| 4,048,136 | 9/1977 | Kobayashi et al. | 260/42.14 |
| 4,115,338 | 9/1978 | Kobayashi et al. | 260/29.4 |
| 4,522,655 | 6/1985 | Claasen et al. | 106/290 |
| 4,565,716 | 1/1986 | Williams, Jr. et al. | 427/216 |
| 4,610,929 | 9/1986 | Mosser et al. | 428/421 |
| 4,675,358 | 6/1987 | Frangou | 524/439 |
| 5,010,140 | 4/1991 | Antonelli et al. | 525/269 |
| 5,028,639 | 7/1991 | Treutlein et al. | 523/200 |
| 5,028,677 | 7/1991 | Janowicz | 526/329.7 |
| 5,039,343 | 8/1991 | Umeda et al. | 106/404 |
| 5,104,922 | 4/1992 | Chang | 24/441 |
| 5,231,131 | 7/1993 | Chu et al. | 524/504 |

OTHER PUBLICATIONS

Bykova I. D., Kalaus E. E., Ryzhov. V. A., Passivation of Aluminium Powder for use in Water–Dispersed Paints, *Lakokras. Mat. 1978*, No. 4, 18: Continent. Paint Resin News 1978, vol. 16, No. 11, 245.

*Primary Examiner*—W. Robinson H. Clark
*Attorney, Agent, or Firm*—Hilmar L. Fricke

[57] ABSTRACT

A graft copolymer dispersant (binder) having a weight average molecular weight of about 5,000–100,000 wherein: (1) the graft copolymer has a polymeric backbone formed by polymerizing ethylenically unsaturated monomers; (2) the graft copolymer has macromonomer side chains attached to the backbone at a single terminal point that have weight average molecular weights of about 1,000–30,000 and are formed from by polymerizing ethylenically unsaturated monomers in the presence of a cobalt chain transfer agent. The graft copolymer further contains about 2 to 70% by weight, based on the weight of the graft copolymer, of polymerized constituents having a phosphate moiety or phosphoric acid moieties that are polymerized into the backbone, the side chains, or both. The graft copolymer is neutralized with an inorganic base or an amine.

6 Claims, No Drawings

STABLE AQUEOUS METALLIC FLAKE DISPERSION USING PHOSPHATED ACRYLIC POLYMER DISPERSANT

This is a division of application Ser. No. 08/294,002, filed Aug. 22, 1994.

TECHNICAL FIELD

This invention relates to a stable aqueous metallic flake dispersion that utilizes a phosphated acrylic polymer dispersant. In particular this invention is directed to stable aqueous aluminum flake dispersions that utilizes a branched phosphated acrylic polymer

BACKGROUND OF THE INVENTION

The use of metallic flake pigments such as aluminum flake pigments in coating compositions used in particular for exterior finishes for automobiles and trucks to provide the finish with metallic glamour is well known. There are relatively few problems with the addition of these metallic flakes by conventional methods to solvent based coating compositions but in waterborne compositions, the metallic flake, in particular, aluminum flake, reacts with water and any acid constituents present in the coating composition and the flake deteriorates and can cause the evolution of gas and finishes formed with such coatings have a reduced brightness.

To avoid such problems, phosphated linear random polymers have been used. Such polymers have been added to metallic flake containing coating compositions as shown in Frangou U.S. Pat. No. 4,675,358 issued Jun. 23, 1987 and in Chang U.S. Pat. No. 5,104,922 issued Apr. 14, 1992. The phosphated portion of the polymer provides passivation of the flake. Residual phosphoric acid groups attached to the polymer are neutralized with an amine or an inorganic base to disperse the polymer into water. These polymers must be sufficiently hydrophobic in order to associate with the metallic flake which typically is an aluminum flake whose surface area is hydrophobic. To obtain a balance of properties with these polymers has been very difficult. If more passivation is needed for the flake, the phosphated portion of the polymer is increased but at the expense of the hydrophobic portion of the polymer which reduces the dispersibility of the polymer. On the other hand, if more dispersibility is needed, the phosphated portion of the polymer is reduced but protection provided to the flake is reduced proportionately. Optimum passivation and dispersibility cannot be obtained since these properties of passivation and dispersibility of the polymer are being balanced against one another. These phosphated polymers offered some improved protection to metallic flake pigments against the evolution of gases and did improve the stability of coating compositions formulated with metallic pigments but additional improvements for long term stability and prevention of gassing are still required.

A polymeric dispersant is needed that will form an aqueous pigment dispersion that is stable, will protect and not allow for the deterioration of the metallic flake pigment, will not allow for the formation of gases and is compatible with a variety of polymeric film forming binders conventionally used in water based coating compositions and that will cure with the film forming binder to form a finish of automotive quality that does not deteriorate on weathering because of adverse properties of the polymeric dispersant.

SUMMARY OF THE INVENTION

A pigment dispersion useful for forming aqueous coating compositions containing metallic flake pigment, an aqueous carrier and a phosphatized graft copolymer dispersant (binder);

wherein the graft copolymer has a weight average molecular weight of about 5,000–100,000 and contains about 20–80% by weight of a polymeric backbone and about 80–20% by weight of macromonomer side chains attached to the backbone wherein (1) the polymeric backbone is formed of polymerized ethylenically unsaturated monomers and (2) the side chains are macromonomers that are attached to the backbone at a single terminal point and formed from polymerized ethylenically unsaturated monomers that are polymerized in the presence of a cobalt chain transfer agent and have a weight average molecular weight of about 1,000–30,000;

wherein the graft copolymer contains about 2 to 70% by weight, based on the weight of the graft copolymer, of polymerized constituents having a phosphate moiety and phosphoric acid moieties that are polymerized into the backbone, the side chains or both and the polymer is neutralized with an inorganic base or an amine; and
the metallic flake pigment is present in a binder to pigment weight ratio of least 10/100.

A process for making the dispersion, coating compositions containing the novel dispersion, the graft copolymer and the process for making the graft copolymer also are part of this invention.

DETAILED DESCRIPTION OF THE INVENTION

The novel pigment dispersion is stable and in general is non-flocculated or agglomerated and is compatible with a variety of polymeric film forming binders that are conventionally used in waterborne coating compositions and in particular is compatible with acrylic polymers that are widely used in waterborne coatings. The graft copolymer dispersant used in the pigment dispersion upon curing of the coating, generally reacts with other film forming components of the coating composition and becomes part of the film and does not cause deterioration of the film upon weathering as may occur if it were an unreacted component of the film. The graft copolymer protects the metallic flake pigment and substantially reduces gassing caused usually by reaction of the metallic flake pigment with acidic components of the coating composition. Also, the freeze-thaw stability of the pigment dispersion is improved. Because the graft copolymer is an excellent pigment dispersant, the ratio of copolymer to pigment is less than is used with conventional dispersants and by using less of the dispersant water sensitivity of the resulting finish is reduced.

By using a graft copolymer to form the pigment dispersion rather than a linear random copolymer, an optimum copolymer composition can be formed which will provide maximum passivation of the flake and will adequately disperse the flake and form a stable dispersion and stable aqueous coating composition which utilize the dispersion. The surface of the metallic flake is hydrophobic and either the backbone or the side chains of the graft copolymer are formed from hydrophobic monomers which are attracted to the surface of the flake. Phosphate groups which passivate the flake can be obtained by polymerizing glycidyl (meth) acrylate, meaning either glycidyl acrylate or glycidyl methacrylate, into the backbone or side chains and subsequently reacting the glycidyl groups with phosphoric acid or phosphorus pentoxide. Unreacted or residual phosphoric acid group are neutralized with amine or an inorganic base for dispersion into water. The remainder of the graft copolymer can be adjusted to improve dispersibility of the flake and make the copolymer more compatible with other components of the binder to form a stabilized pigment dispersion.

Another way to introduce phosphate groups into the polymer, is to form a polymer having reactive hydroxyl group for example, by forming the copolymer with hydroxy alkyl methacrylates or acrylates and subsequently reacting the hydroxy groups with phosphorus pentoxide and neutralizing phosphoric acid groups with amine or inorganic base as above.

A number of parameters can be adjusted with a graft copolymer to form an optimum dispersant which can not be accomplished with a linear polymer. The ratio of backbone to side chains can be adjusted, the molecular weight of the backbone or side chains can be increased or decreased, the phosphate content of the copolymer in either the side chains or backbone can be adjusted and the hydrophobicity and hydrophilicity of the backbone and side chains can be adjusted as needed to provide optimum passivation and dispersibility. By using a graft copolymer rather than a linear polymer, a substantially wider range of copolymers can formulated that balance, hydrophilicity and hydrophobicity and phosphate content of the graft copolymer to form superior dispersions and coating compositions in comparison to the compositions than could be formed with linear polymers.

The backbone of the graft copolymer can be hydrophobic in comparison to the side chains or the backbone can be hydrophilic in comparison to the side chains. For example, if the backbone of the graft copolymer is hydrophobic, it is formed with a sufficient amount of hydrophobic monomers to make the backbone hydrophobic in comparison to the side chains. The backbone of such a graft copolymer is attracted to the flake and passivates the flake and the side chains of the graft copolymer can be hydrophilic sufficient to disperse the flake in water to form a dispersion. Conversely, the backbone can be hydrophilic and the side chain hydrophobic. Either the backbone or the side chains of the graft copolymer can be formed from hydrophilic monomers which are attracted to water in the composition to disperse the flake in water. It is not necessary that either the backbone or the side chains of thee graft copolymer be formed from monomers that are entirely hydrophobic or hydrophilic but it is necessary that the backbone and the side chains be hydrophobic or hydrophilic in comparison to each other. Also, it is not necessary that the phosphate groups all be incorporated into the hydrophobic part of the graft copolymer but can be incorporated into the hydrophilic part of the polymer as well. Residual phosphoric acid groups when subsequently neutralized with either an amine or an inorganic base aid in dispersing the polymer.

The graft copolymer preferably contains about 25–75% by weight of polymeric backbone and correspondingly about 75–25% by weight of side chains. The graft copolymer has a weight average molecular weight of about 5,000–100,000 and preferably about 10,000–40,000.

Molecular weights are determined by Gel Permeation Chromatography using polystyrene as the standard and tetrahydrofuran as the carrier solvent.

The side chains of the graft copolymer are formed from macromonomers that have a weight average molecular weight of about 1,000–30,000 and preferably 2,000–15,000. The macromonomers are formed by polymerizing ethylenically unsaturated monomers in the presence of a catalytic chain transfer agent containing $Co^{+2}$ or $Co^{+3}$. Then the graft copolymer is formed by polymerizing ethylenically unsaturated monomers and the macromonomers by using conventional polymerization catalyst. The ethylenically unsaturated monomers are polymerized with the macromonomers via the single terminal unsaturated group of the macromonomer.

The backbone of the resulting graft copolymer is of the polymerized ethylenically unsaturated monomers and the side chains are of the macromonomers polymerized into the backbone. Glycidyl (meth)acrylate is incorporated into either the backbone or side chains or both to provide reactive glycidyl groups and then the glycidyl groups are reacted with phosphoric acid to provide the graft copolymer with pendant phosphate groups. The molar equivalents of glycidyl groups to acid groups is about 1/1.

The following ethylenically unsaturated monomers are used to form hydrophobic polymeric segments of the graft copolymer: alkyl acrylates and methacrylates having 1–18 carbon atoms in the alkyl group such as methyl methacrylate, ethyl methacrylate, ethyl acrylate, propyl methacrylate, propyl acrylate, isopropyl methacrylate, isopropyl acrylate, butyl methacrylate, butyl acrylate, pentyl methacrylate, pentyl acrylate, hexyl methacrylate, hexyl acrylate, 2-ethyl hexyl methacrylate, 2-ethyl hexyl acrylate, nonyl methacrylate nonyl acrylate, lauryl methacrylate, lauryl acrylate, stearyl methacrylate, stearyl acrylate and the like; cycloaliphatic methacrylates also can be used such as trimethylcyclohexyl methacrylate, isobutylcyclohexyl methacrylate, and the like; aryl methacrylates and acrylates also can be used such as benzyl methacrylate and benzyl acrylate. Other polymerizable monomers that can be used are isobornyl acrylate, isobornyl methacrylate, styrene, alpha methyl styrene, methacrylamide and methacrylonitrile.

The following ethylenically unsaturated monomers are used to form hydrophilic polymer segments of the graft copolymer: hydroxy alkyl acrylate and methacrylates having 1–4 carbon atoms in the alkyl group such as hydroxy methyl acrylate, hydroxy methyl methacrylate, hydroxy ethyl acrylate, hydroxy ethyl methacrylate, hydroxy propyl acrylate, hydroxy propyl methacrylate, hydroxy butyl acrylate, hydroxy butyl acrylate and the like. Other useful monomers are acrylamide, acrylonitrile nitro phenol acrylate, nitro phenol methacrylate, phthalimido methyl acrylate, phthalimido methacrylate, and the like.

In the preparation of the macromonomer to ensure that the resulting macromonomer only has one terminal ethylenically unsaturated group which will polymerize with the backbone monomers to form the graft copolymer, the macromonomer is polymerized by using a catalytic cobalt chain transfer agent that preferably contains a $Co^{+2}$ or $Co^{+3}$ group. Typically, in the first step of the process for preparing the macromonomer, the monomers are blended with an inert organic solvent and a cobalt chain transfer agent and heated usually to the reflux temperature of the reaction mixture. In subsequent steps additional monomers and cobalt catalyst and conventional azo type polymerization catalyst such as 2,2'-azobis(2-methylbutanenitrile) and 2,2'-azobis(2,4'-dimethylpentanenitrile) 2,2'-azobis(2,4-dimethyl-4-methoxyvaleronitrile) are added and polymerization is continued at about 100°–135° C. for about 4–8 hours until a macromonomer is formed of the desired molecular weight.

Preferred cobalt chain transfer agents or catalysts are described in U.S. Pat. No. 4,680,352 to Janowicz et al and U.S. Pat. No. 4,722,984 to Janowicz and WO 87/03605, hereby incorporated by reference in their entirety. Most preferred are pentacyanocobaltate (II or III), diaquabis(borondifluorodimethyl-glyoximato) cobaltate(II or III) and diaquabis(borondifluorophenylglyoximato) cobaltate (II or III). Typically these chain transfer agents used at concentrations of about 5–1000 ppm based on the monomers used.

One preferred macromonomer contains about 1–10% by weight of isobutyl methacrylate, 65–85% by weight 2-ethyl hexyl methacrylate and 10–30% by weight hydroxy ethyl methacrylate and has a lo weight average molecular weight of about 7,000–10,000. Another preferred macromonomer contains about 35–45% by weight of isobutyl methacrylate, 35–45% by weight 2-ethyl hexyl methacrylate and 15–25% by weight of hydroxy ethyl methacrylate and has a weight average molecular weight of about 7,000–10,000.

After the macromonomer is formed as described above, optionally solvent is stripped off and the backbone monomers are added to the macromonomer along with additional solvent and polymerization catalyst. Any of the aforementioned azo type catalyst can be used as can other suitable catalyst such as peroxides and hydroperoxides. Typical of such catalyst are di-tertiary butyl peroxide, di-cumylperoxide, tertiaryamyl peroxide, cumenehydroperoxide, di(n-propyl) peroxydicarbonate, peresters such as amyl peroxyacetate, t-butyl peracetate and the like. Polymerization is continued at about 100°–135° C. for about 4–8 hours usually at the reflux temperature of the reaction mixture until a graft copolymer is formed having the desired molecular weight.

Typical solvents that can be used to form the macromonomer or the graft copolymer are ketones such as methyl ethyl ketone, isobutyl ketone, ethyl amyl ketone, acetone, alcohols such as methanol, ethanol, isopropanol, esters such as ethyl acetate and butyl acetate, glycols such as ethylene glycol, propylene glycol, ethers such as tetrahydrofuran, ethylene glycol mono butyl ether, aromatic solvents such as toluene and xylene, nitro paraffins such as 1-nitropropane and 2-nitropropane and the like.

After the graft copolymer is formed, phosphoric acid or phosphorous pentoxide and solvent are added and the reaction is continued at about 50°–70° C. for 4–6 hours or until all the glycidyl groups or hydroxyl groups are reacted. The extent of reaction can be determined by making acid no. measurements. The polymer is blended with flake to form a dispersion in an organic solvent followed by neutralization with an amine or an inorganic base and then water is added to form an aqueous dispersion.

Typical amines that can be used include amino methyl propanol, amino ethyl propanol, dimethyl ethanol amine, triethylamine and the like. One preferred amine is amino methyl propanol and the preferred inorganic base is ammonium hydroxide.

Particularly useful graft copolymers include the following:

A graft copolymer having a backbone of polymerized monomers of styrene/methyl methaerylate/butyl aerylate/glycidyl methacrylate/hydroxyethyl methacrylate in weight ratios of 20/25/15/20/20, 30/20/15/20/15 and 20/25/25/20/10 and having a weight average molecular weight of about 14,000–18,000 and side chains of a macromonomer of polymerized monomers of isobutyl methacrylate/2-ethylhexyl methacrylate/hydroxyethyl methacrylate in weight ratios of 5/75/20 and 40/40/20 and having a weight average molecular weight of about 6,000–10,000. The glycidyl groups of the glycidyl methacrylate constituent are reacted with phosphoric acid on a 1/1 molar equivalent basis. The graft copolymer can contain 20–80% by weight backbone and correspondingly 80–20% by weight side chains.

A graft copolymer having a backbone of polymerized monomers of styrene/methyl methacrylate/butyl acrylate/2-ethyl hexyl methacrylate/hydroxy ethyl acrylate having a weight average molecular weight of about 14,000–30,000 and side chains of a macromonomer of polymerized monomers of butyl methacrylate/glycidyl methacrylate.

A graft copolymer having a backbone of polymerized styrene/methyl methacrylate/butyl acrylate/2-ethyl hexyl methacrylate/hydroxy ethyl acrylate/glycidyl methacrylate and side chains of macromonomers of butyl methacrylate/glycidyl methacrylate.

To form a metallic flake pigment dispersion, metallic flake pigment such as aluminum flake is mixed with a solution of the phosphated acrylic graft copolymer in an organic solvent and then an amine or an inorganic base is added to neutralize the copolymer and water is added to form the dispersion. Conventional mixing is used to form the dispersion. Often an associate thickener is added to aid in formation of a stable dispersion. The resulting pigment dispersion contains about 10–30% by weight of pigment and dispersant and correspondingly about 90–70% by weight of aqueous carrier and has a dispersant binder to pigment weight ratio of at least 10/100 and preferably about 10/100 to 100/100.

In addition to the metallic flake pigment any of the conventional pigments used in paints in particular waterborne paints can be used to form the pigment dispersion such as metallic oxides like titanium dioxide, iron oxides of various colors, zinc oxide, carbon black, filler pigments such as talc, china clay, barytes, carbonates, silicates and a wide variety of organic pigments such as quinacridones, phthalocyanines, perylenes, azo pigments, indanthrones, carbazoles such as carbazole violet, isoindolinones, isoindolones, thioindigo reds, benzimidazolinones. Typically useful metallic flakes are aluminum flake which is preferred, bronze, nickel stainless steel flakes, pearlescent flakes, coated mica flakes such as mica flakes coated with finely divided titanium dioxide and the like.

It may be desirable to add other optional ingredients to the pigment dispersion such as antioxidants, flow control agents, rheology control agents such as fumed silica, microgels UV stabilizers screeners, quenchers and absorbers.

Under some circumstances, it may be desirable to form pigment dispersions by using the phosphated acrylic graft copolymer that do not contain metallic flake pigments but any of the aforementioned non metallic flake pigments. Such pigments do not require passivation but it is expected that the dispersions would have excellent compatibility with the aqueous paint composition and metallic flake dispersion made with the phosphated graft copolymer.

Pigment dispersions of this invention can be added to a variety of waterborne coating compositions such as topcoats which may be monocoats or basecoats of a clear coat base coat finish and may also be added to primers and primer surfacers. These compositions preferably have an acrylic polymer as the film forming constituent and may contain crosslinking agents such as blocked isocyanate, alkylated melamines, epoxy resins and the like. Other film forming polymers can also be used such as acrylourethanes, polyesters and polyester urethanes, polyethers and polyether urethanes that are compatible with the pigment dispersion. It is desirable to have the film forming polymer of the coating composition be similar to the polymer of the pigment dispersion so that on curing the polymer of the pigment dispersion will cure with the coating polymer and become part of the film or coating.

The following examples illustrate the invention. All parts and percentages are on a weight basis unless otherwise indicated. Molecular weights are determined by Gel Permeation Chromatography using polystyrene as the standard and tetrahydrofuran as the carrier solvent.

EXAMPLE 1

MACROMONOMER PREPARATION

A macromonomer was prepared by charging the following constituents into a 2 liter flask equipped with a thermometer, agitator dropping funnels, reflux condenser and a means for maintaining a nitrogen blanket over the reactants:

|  | Parts by Weight |
|---|---|
| Portion 1 | |
| Isobutyl methacrylate monomer (IBMA) | 20.30 |
| 2-Ethylhexylmethacrylate monomer (2EHMA) | 304.90 |
| Hydroxyethylmethacrylate monomer (HEMA) | 81.30 |
| Butyl acetate | 100.00 |
| Toluene | 160.00 |
| Portion 2 | |
| Diaquabis(borondifluorodiphenyl-glyoximato) cobalt(II), Co(DPG-BF$_2$) | 0.03 |
| Methyl ethyl ketone | 17.10 |
| 2,2'-azobis(2-methylbutanenitrile) | 0.35 |
| Portion 3 | |
| Isobutyl methacrylate monomer | 17.80 |
| 2 Ethylhexyl methacrylate monomer | 267.50 |
| Hydroxyethyl methacrylate monomer | 71.40 |
| 2,2' azobis(2-methylbutanenitrile) | 1.35 |
| Toluene | 86.50 |
| Portion 4 | |
| Toluene | 32.00 |
| 2,2' azobis(2-methylbutanenitrile) | 0.32 |
| Portion 5 | |
| T-butyl peracetate | 0.20 |
| Butyl Cellosolve | 31.40 |
| Total | 1192.45 |

Portion 1 was heated was heated to its reflux temperature (about 135°–140° C.). Portion 2 was added over a 5 minute period while maintaining the reaction mixture at its reflux temperature. Portion 3 was added over 240 minute period while maintaining the reaction mixture at its reflux temperature and the reaction mixture was held at its reflux temperature for an additional 30 minutes. Portion 4 was added over a 60 minute period while the reaction mixture was held at its reflux temperature and then held at this temperature for an additional 60 minutes. Portion 5 was added with mixing and the resulting composition was cooled.

The resulting macromonomer solution had a solids content of 64% and had a Gardner Holdt Viscosity of U and the macromonomer had a composition of IBMA/2EHMA/HEMA 5/75/20. % Vinyl termination of the macromonomer as measured by TGA (Thermogravimetric Analysis) is in excess of 95%. The weight average molecular weight of the macromonomer is 8400 and the macromonomer solution has a Gardner Holdt viscosity of U.

ACRYLIC GRAFT COPOLYMER A PREPARATION

The following constituents were charged into a 5 liter flask equipped as above to form a graft copolymer solution:

|  | Parts by Weight |
|---|---|
| Portion 1 | |
| Methyl amyl ketone | 515.2 |
| Macromonomer solution (prepared above) | 1652.1 |
| Portion 2 | |
| Styrene monomer (S) | 211.5 |
| Methyl methacrylate monomer (MMA) | 264.3 |
| Butyl acrylate monomer (BA) | 158.6 |
| Glycidyl methacrylate monomer (GMA) | 211.5 |
| Hydroxyethyl acrylate monomer (HEA) | 211.5 |
| T-butyl per acetate | 37.7 |
| Total | 3262.4 |

Portion 1 was heated to about 125° C. and then Portion 2 was premixed and added over a 180 minute period while maintaining the reaction mixture at about 125° C. and under constant agitation. The reaction mixture was held at this temperature for an additional 120 minutes and cooled to room temperature The resulting acrylic graft copolymer A solution had a solid content of 64 % by weight and had a Gardner Holdt Viscosity of V and the branched polymer contains 50% macromonomer side chains and 50% backbone of a composition of S/MMA/BA/GMA/HEA in a weight ratio of 20/25/15/20/20 and had a weight average molecular weight of 16,000.

PHOSPHATED ACRYLIC GRAFT COPOLYMER A PREPARATION

The following constituents were charged into a 5 liter flask equipped as above:

|  | |
|---|---|
| Portion 1 | |
| Isopropanol | 263.10 |
| Aqueous 85% phosphoric acid solution | 54.67 |
| Portion 2 | |
| Branched acrylic polymer A solution (prepared above) | 1200.00 |
| Isopropanol | 475.00 |
| Methyl ethyl ketone | 239.10 |
| Total | 2231.87 |

Portion 1 was heated to 50° C. and then Portion 2 was added over a 90 minute period while maintaining the temperature at 50° C. The temperature was increased to 70° C. and the reaction mixture was held at this temperature for about 5 hours and cooled to room temperature. The resulting phosphated branched acrylic polymer A solution had a Gardner Holdt Viscosity of A3, a solids content of 34.5% by weight and the copolymer had a weight average molecular weight of 16,400.

PHOSPHATED ACRYLIC GRAFT COPOLYMER B SOLUTION

Prepared identically as above except the weight ratio of macromonomer to backbone was 70/30.

PHOSPHATED ACRYLIC GRAFT COPOLYMER C SOLUTION

Prepared identically as above phosphated acrylic graft copolymer A solution except the weight ratio of macromonomer to backbone was 30/70.

PHOSPHATED ACRYLIC GRAFT COPOLYMER D SOLUTION

Prepared identically as above phosphated acrylic graft copolymer A solution except the macromonomer had the following composition: IBMA/2EHMA/HEMA in a weight ratio of 40/40/20.

PHOSPHATED ACRYLIC GRAFT COPOLYMER E SOLUTION

Prepared identically as above phosphated acrylic graft copolymer A solution except the backbone had the following composition: S/MMA/BA/GMA/HEA in a weight ratio of 30/15/15/20/20.

PHOSPHATED ACRYLIC GRAFT COPOLYMER F SOLUTION

Prepared identically as above phosphated acrylic graft copolymer A solution except the backbone had the following composition: S/MMA/BA/GMA/HEA in a weight ratio of 20/25/25/20/10.

PHOSPHATED ACRYLIC GRAFT COPOLYMER G SOLUTION

Prepared identically as above phosphated acrylic graft copolymer A solution except the backbone had the following composition: S/MMA/BA/GMA/HEA in a weight ratio of 30/10/20/30/10.

PHOSPHATED ACRYLIC GRAFT COPOLYMER H SOLUTION

Prepared identically as above phosphated acrylic graft copolymer A solution except the macromonomer had the following composition: BMA/GMA in a weight ratio of 80/20 and the backbone had the following composition S/MMA/BA/2EHMA/HEA in a weight ratio of 30/15/25/25/5.

PHOSPHATED ACRYLIC GRAFT COPOLYMER I SOLUTION

Prepared identically as above phosphated acrylic graft copolymer A solution except the macromonomer had the following composition: BMA/GMA in a weight ratio of 80/20 and the backbone had the following composition: S/MMA/BA/2EHMA/HEA/GMA in a weight ratio of 30/15/25/15/5/10.

PHOSPHATED ACRYLIC GRAFT COPOLYMER J SOLUTION

Prepared identically as above phosphated acrylic graft copolymer G solution except that 1-nitropropane replaced methyl ethyl ketone in the phosphating step.

EXAMPLE 2

An aluminum flake pigment dispersion was prepared by charging the following constituents into a mixing vessel agitated with an air mixer: 311 parts of 1-pentanol, 133 parts n-butanol, 62 parts of phosphated acrylic graft copolymer A solution (prepared in Example 1 ) and 283 parts of aluminum paste (65% aluminum flake in mineral spirits). The constituents were agitated for 60 minutes to form a dispersion. 146 parts of this dispersion was added to another mixing vessel and the following constituents were added with constant mixing: 3 parts of dimethyl ethanol amine, 1 part latex thickener (Henkel DSX-1550 acrylic associative thickener) and mixed for 30 minutes, 93.5 parts deionized water, 214.3 parts acrylic copolymer latex, 85 parts of aleionized water, 0.85 parts of latex thickener (described above) and mixed for 1 hour, 4.25 part of 5% aqueous ammonium hydroxide solution, 102 parts deionized water, 4.25 parts "Acrysol" ASE-60 Thickener (acrylic acid copolymer from Rohm and Haas)and 202 parts deionized water. The constituents were mixed for 60 minutes to form a dispersion.

The resulting dispersion had a weight solids ratio of phosphated branched acrylic polymer to aluminum flake of 10:100. A sample of the dispersion was drawn down on a glass panel dried and evaluated for degree of flocculation and brightness as quantified by lightness at 2 degrees from the vertical on a DuPont Colorimeter. A pint can of the dispersion was placed in an oven at 50° C. for one and two weeks and evaluated for aluminum flake passivation by checking for excessive gas build up in the can and loss of dispersion. The results of these test are shown in the following table.

A control aluminum flake dispersion identical to the above dispersion was formed in which the phosphated acrylic graft copolymer was omitted and the dispersion was tested as above. The results are shown in the following table.

A linear phosphated acrylic polymer of methyl methacrylate, butyl acrylate, glycidyl methacrylate in a weight ratio of 38/37/25 having a weight average molecular weight of about 21,500 was prepared by conventional polymerization methods using conventional mercaptan and azo catalysts and phosphated with phosphoric acid in 1:1 GMA:phosphoric acid molar equivalent ratio. An aluminum flake dispersion using the above constituents and procedure was prepared with the exception that the above linear polymer was used in place of the phosphated acrylic graft copolymer. The dispersion was tested as above and the results are shown in the following table.

Phosphated acrylic graft copolymers E and F prepared in Example 1 were each formulated into aluminum flake dispersions as above except the polymers E and F were each substituted for polymer A in each of the dispersions. Each of the dispersions was tested as above and the results are shown in the following table.

TABLE

| Aluminum Flake Dispersion | Brightness | Stability at 50° C. |
|---|---|---|
| Phosphated acrylic graft copolymer A | [001f][001f][001f] | 1 week |
| Phosphated acrylic graft copolymer E | 141 | >4 weeks |
| Phosphated acrylic graft copolymer F | 139 | >4 weeks |
| Control - No phosphated acrylic copolymer present | Not measured | 1 hour gassing & loss of dispersion quality |
| Linear phosphated acrylic copolymer | Not measured | <2 days |

The above results show that the phosphated acrylic graft copolymers of the invention provide better quality dispersions that are substantially more resistant to gassing when compared to the control in which no phosphated acrylic polymer was present and to a linear phosphated acrylic polymer representative of the prior art.

We claim:

1. A graft copolymer having a weight average molecular weight of about 5,000–100,000 and comprising about 10–80% by weight of a polymeric backbone and about 80–20% by weight of macromonomer side chains attached to the backbone wherein
   (1) the polymeric backbone being hydrophilic in comparison to the side chains and consists essentially of polymerized ethylenically unsaturated monomers and
   (2) the side chains being hydrophobic in comparison to the backbone and consist of macromonomers that are attached to the backbone at a single terminal point and consist essentially of polymerized ethylenically unsaturated monomers that are polymerized in the presence of a cobalt chain transfer agent and have a weight average molecular weight of about 1,000–30,000;

wherein the graft copolymer contains about 2 to 70% by weight, based on the weight of the graft copolymer, of polymerized glycidyl (meth)acrylate monomers in the backbone and the glycidyl groups being reacted with phosphoric acid or phosphorous pentoxide.

2. The graft copolymer of claim 1 in which the graft copolymer comprises about 25–75% by weight of macromonomer and correspondingly about 75–25% by weight of polymeric backbone and the graft copolymer has a weight average molecular weight of about 10,000–40,000.

3. The graft copolymer resin of claim 2 in which the macromonomer is formed by polymerizing the monomers in the presence of a catalytic chain transfer agent containing $Co^{+2}$ or $Co^{+3}$.

4. The graft copolymer of claim 3 in which the macromonomer consists essentially of polymerized monomers selected from the group consisting of styrene, alkyl methacrylates, alkyl acrylates each having 1–18 carbon atoms in the alkyl groups and hydroxy alkyl methacrylate or hydroxy alkyl acrylate monomers each having 1–4 carbon atoms in the alkyl groups and any mixtures thereof, a backbone of polymerized monomers selected from the group consisting of styrene, alkyl methacrylate, alkyl acrylate, each having 1–18 carbon atoms in the alkyl groups, hydroxy alkyl methacrylate or hydroxy alkyl acrylate each having 1–4 carbon atoms in the alkyl group and any mixtures thereof and glycidyl methacrylate or glycidyl acrylate.

5. The graft copolymer of claim 3 in which the macromonomer consists essentially of polymerized monomers selected from the group consisting of styrene, alkyl methacrylates, alkyl acrylates each having 1–18 carbon atoms in the alkyl groups and hydroxy alkyl methacrylate or hydroxy alkyl acrylate monomers each having 1–4 carbon atoms in the alkyl groups and any mixtures thereof and glycidyl methacrylate or glycidyl methacrylate, a backbone of polymerized monomers selected from the group consisting of styrene, alkyl methacrylate, alkyl acrylate, each having 1–18 carbon atoms in the alkyl groups, hydroxy alkyl methacrylate or hydroxy alkyl acrylate each having 1–4 carbon atoms in the alkyl group.

6. The graft copolymer of claim 3 in which the macromonomer consists essentially of polymerized monomers selected from the group consisting of styrene, alkyl methacrylates, alkyl acrylates each having 1–18 carbon atoms in the alkyl groups and hydroxy alkyl methacrylate or hydroxy alkyl acrylate each having 1–4 carbon atoms in the alkyl groups and any mixtures thereof and glycidyl methacrylate or glycidyl methacrylate, a backbone of polymerized monomers selected from the group consisting of styrene, alkyl methacrylate, alkyl acrylate, each having 1–18 carbon atoms in the alkyl groups, hydroxy alkyl methacrylate or hydroxy alkyl acrylate each having 1–4 carbon atoms in the alkyl group and any mixtures thereof and glycidyl methacrylate or glycidyl acrylate.

* * * * *